Dec. 30, 1941.   H. L. PITMAN   2,267,946
TYPEWRITING MACHINE
Filed April 10, 1939
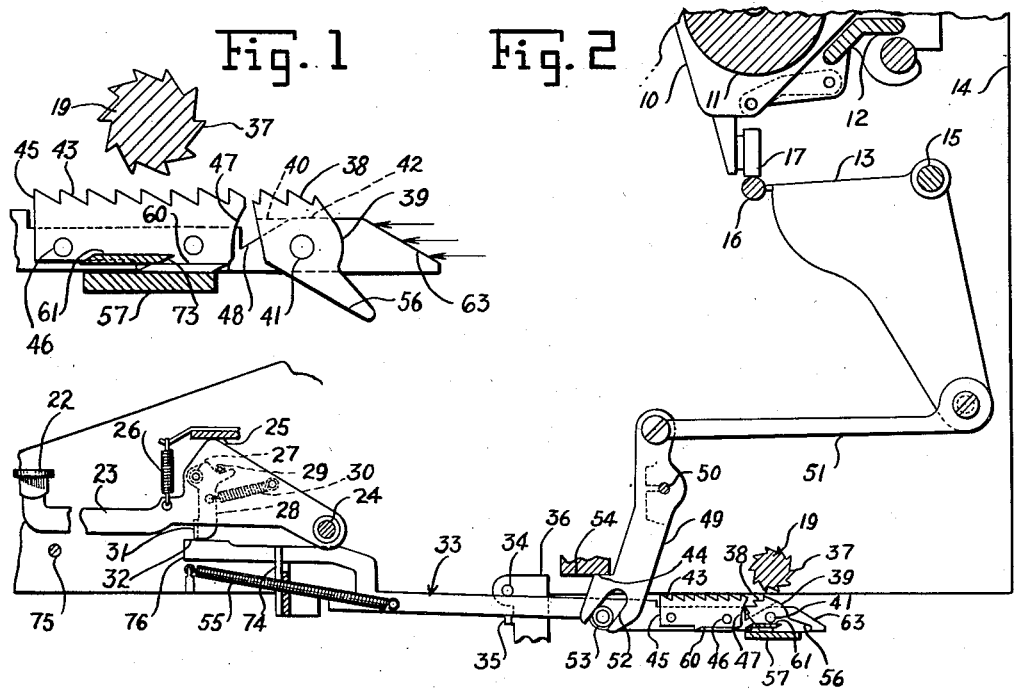
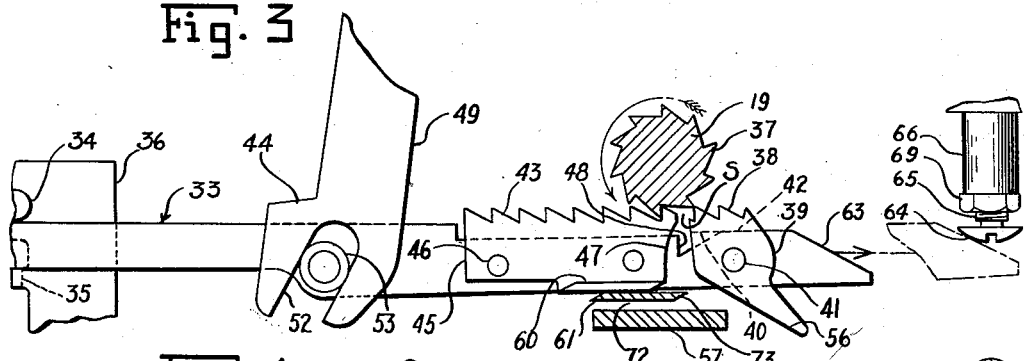
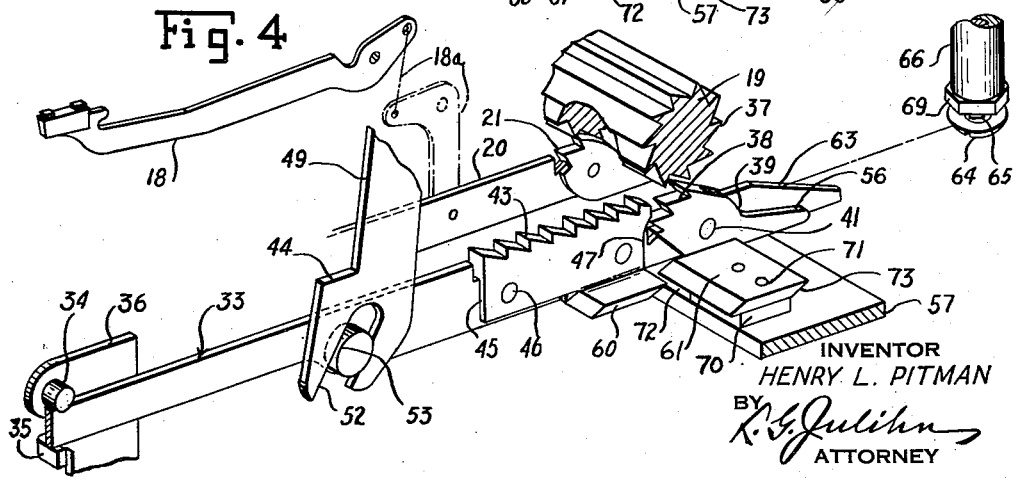
INVENTOR
HENRY L. PITMAN
BY
ATTORNEY Patented Dec. 30, 1941

2,267,946

UNITED STATES PATENT OFFICE 2,267,946

TYPEWRITING MACHINE

Henry L. Pitman, Hartford, Conn., assignor to Underwood Elliott Fisher Company, New York, N. Y., a corporation of Delaware Application April 10, 1939, Serial No. 266,995

8 Claims. (Cl. 197—17)

This invention relates to power operated typewriters and more particularly to means responsive to operation of a key for coupling a power actuatable part, such as a type action, case-shift mechanism or the like, to a rotary power shaft or snatch roll.

A snatch-roll-engaging element operatively connected to said actuatable part is normally disconnected from the snatch roll and is movable by means of the key to engage the snatch roll. Upon its engagement with the snatch roll such element may be driven like a rack, that is, in a path substantially tangent to the snatch roll, to actuate said part.

In certain former machines such element has a limited number of teeth, say, one or two teeth, so that its engagement with teeth on the periphery of the snatch roll is transient since by reason of the rack-like movement of the element the one or two teeth thereof pass out of engagement with the snatch roll teeth and hence driven engagement of said element with the snatch roll is limited and it is only during a comparatively small angle of its rotation that the snatch roll drives said element.

Although the teeth of said element tend to become disengaged from the snatch roll as the latter drives said element, it has been found that said teeth will remain engaged with the snatch roll, independently of the key, for the duration of said small angular rotation. Thus, in correspondence to said small angle of rotation, the snatch roll imparts an impulsive drive to said element to actuate a part in a stroke of comparatively high speed. While such impulsive, high-speed engendering stroke is suitable, say, for a type action, it is not suitable for actuation of a case shift mechanism in which rebound of the parts following a case shift thereof is not tolerable and in which, moreover, the parts to be moved are comparatively heavy and this correspondingly gives rise to noise and wear-producing heavy shocks at the sudden inception and arrest of fast case-shift movement.

The general object of this invention is to provide a simple, durable mechanism responsive to operation of the key for coupling a power actuatable mechanism, such as a case-shift mechanism, to a snatch roll and having the latter actuate such mechanism deliberately and therefore in a stroke of suitably moderate speed.

A feature of the invention is the employment of a coupling element in one of its simplest and most efficient forms, namely, in the form of a toothed rack operable in a stroke tangent to the snatch roll and, moreover, provided with such number of teeth as will cause it to be driven by the snatch roll during a materially larger angle of rotation of the latter than is the case in former machines employing a rack having only one or two teeth.

A further feature of the invention is in means for maintaining the rack with certainty in engagement with the snatch roll, independently of the key, and thus overcoming the above mentioned tendency of the rack, while it is being driven extensively by the snatch roll, to become disengaged from the latter.

Another feature resides in employing a floating tooth or teeth as the leading rack tooth or teeth that are the first to be engaged with the snatch roll. To this end said leading tooth or teeth may be embodied in a piece pivoted to the coupling rack and limitedly turnable about the pivot to a stop position upon engagement with the snatch roll so that the leading teeth invariably can settle or float into full and proper mesh with the snatch roll teeth as distinguished from being caught occasionally only by the points or tops of the snatch roll teeth. In this stopped position, the floating tooth or teeth may stand, as will hereinafter appear, in proper rack-teeth-spacing relation with the remaining rack teeth that are provided in sufficient number on the coupling rack consonantly with its desired extensive drive by the snatch roll.

The improved coupling rack and related features are herein illustrated in association with a case-shift mechanism, but it is to be understood that the invention is not limited to such association but is also associable with other mechanisms or parts of a typewriter or the like which are to be operable deliberately in strokes of moderate speed by a snatch roll.

In machines employing a set of power operable type actions, the one or two toothed coupling racks may be employed for coupling said type actions to a snatch roll for impulsive actuation. This same type-action operating snatch roll may also serve for operating other mechanisms such as a case shift mechanism in strokes of moderate speed by employing for such other mechanisms the improved coupling rack. There may thus be one snatch roll universal or common to all the snatch roll operable mechanisms of the machine.

The foregoing and other objects, features and advantages will be apparent from the following description.

In the accompanying drawing:

Figure 1 is a partly sectioned side view showing the relative positions of the snatch roll, the coupling bar or rack, and rack guiding means during the return stroke of the rack.

Figure 2 is a partly sectioned side view illustrating the invention applied to a typewriter case-shift mechanism.

Figure 3 is a side view showing the relation of the parts during the drive of the coupling rack by the snatch roll.

Figure 4 is a perspective showing the parts, including the coupling rack, in normal positions.

Referring now more particularly to the drawing, a frame 10, Figure 2, mounting a platen 11 is shiftable up and down, in a laterally moving typing carriage 12, for case shifting said platen relatively to type actions. A shift frame 13 includes a cross shaft 15 at the axis of which it is rockably supported in the machine frame 14 for up and down case-shift movement of its shift rail 16 along which runs a roller 17 of the platen frame 10. In its lower case position, Figure 2, the platen frame 10 may rest upon side stops, not shown, in the carriage.

Journaled in the machine frame 14 is a longitudinally-fluted or toothed snatch roll 19 rotated counterclockwise continuously during use of the machine by a power drive, herein not shown but which may be as exemplified in the United States Patent No. 2,139,552 to Kurowski, dated December 6, 1938, to which reference may also be had for a fuller illustration of the above mentioned carriage, platen frame and shift frame.

As exemplified in my co-pending application Serial No. 42,611, filed September 28, 1935, the above mentioned type actions may be connected selectively to the snatch roll 19 by means of corresponding drive links or racks, one of which is fragmentarily indicated at 20, Figure 4, each of said links 20 being liftable by means of a type key, not shown, to engage its teeth 21 with said snatch roll. Each type action may comprise a type bar 18 having an operative connection, diagrammatically represented by the dot-and-dash line 18ª, Figure 4, to the corresponding link 20.

The same snatch roll 19 may also serve to actuate the case shiftable part or shift frame 13 as will now be described.

By manual depression of its key 22, a case-shift key lever 23 which may be on a rock shaft 24 journaled in the machine frame is rockable counterclockwise from its normal position, Figure 2, in which it is yieldably held against a stop 25 on the machine frame by a spring 26. Pivoted to said key lever 23 at 27 is a dog 28 normally and yieldably held against a stop pin 29 in said key lever by a spring 30. Said key lever dog 28 has a lateral tab 31 which normally overlies and may engage a horizontal land 32 of a coupling link or bar 33 extending rearwardly from said land to reach under the snatch roll 19 which serves to drive said coupling bar 33 rearwardly as will presently appear. For its rearward and return movement, said coupling bar is slidably supported, at a point intermediate its ends, by and between upper and lower pins 34, 35, projecting laterally from a fixture 36 on the framework. Said pins 34, 35 also form a fulcrum about which the coupling bar 33 is rockable to raise and lower its rear end portion into and out of engagement with the snatch roll 19.

Said rear end portion of the coupling bar is provided with an extended series or sufficient number of teeth so as to be capable of extensive driven engagement with the teeth 37 of the snatch roll. The leading coupling bar teeth 38, in the present instance two full teeth, are formed on the upper edge of a block or piece 39 having a slot 40 midway of its side parts so that the latter straddle the sides of the coupling bar and are pivoted to the latter as at 41. Said piece 39 is thus turnable between a normal idle position, Figure 2, and an effective position, Figure 3, in which said piece is stopped by abutment of the upper confine of its slot 40 with the stop edge of the coupling lever as at 42. In said effective position of the piece 39, its teeth 38 are in line with and form a continuity with the remaining teeth 43 of the series since the intervening space S, Figure 3, may equal the general tooth pitch. The teeth 43 may be made sufficiently broad by forming them on a block 45 fixed to the coupling bar 33 by rivets 46. Said block 45 has a rear end shape 47 so as not to interfere with the turning of the piece 39. The coupling bar 33 may have a cut-out 48 to clear the upper tooth-bearing part of the piece 39 when the latter is turned to the Figure 2 idle position.

Operatively connecting the coupling bar 33 and case shiftable frame 13, there is an intermediate lever 49 fulcrumed to the framework as at 50 and connected by a link 51 to said frame 13.

A cam slot 52 of the intermediate lever 49 engages with a roller 53 on the coupling bar 33. The leverage is proportioned so that, as the case shifts, the intermediate lever 49 has a comparatively wide angle of swing fore and aft whereby the cam slot 52 normally may be materially oblique to the path of the roller 53, as in Figure 2. Thus, at the rearward movement of the coupling bar 33 by the snatch roll 19 to rotate the intermediate lever 49 counterclockwise of Figure 2, the reaction between the roller 53 and the oblique right side of the cam slot 52 tends to turn the coupling bar 33 counterclockwise about the fulcrum 34, 35, and thus conduces to keeping the teeth of the coupling bar in engagement with the teeth of the snatch roll, at least during the initial part of the rearward drive of the coupling bar by said snatch roll. In the normal position of the intermediate lever 49, Figure 2, a shoulder 44 thereof stops against an abutment 54 on the machine frame.

A draw spring 55 anchored to the framework and attached to the coupling bar tends to draw the latter forwardly, and the concomitant reaction of the roller 53 against the left side of the oblique or biased cam slot 52 when the intermediate lever 49 is in its normal position tends to rotate the coupling bar clockwise about the fulcrum 34, 35. This clockwise rotation of the coupling bar is stopped by edgewise abutment of a tail part 56 of the pivot piece 39 on the coupling bar with the upper side of a cross bar 57 having a fixed support on the framework.

Upon raising the rear end of the coupling bar 33 from the Figure 2 position, the teeth 38 of the piece 39 will become engaged with the teeth of the rotating snatch roll and the piece 39 will therefore be turned clockwise on the pivot 41. The tail part 56 of the thus turning piece 39 reacting, as it may, like a prop on the cross bar 57, tends to uplift the rear end of the coupling bar 33 to conduce to keeping the teeth 38 in engagement with the snatch roll while said piece is being turned fully to the Figure 3 position relatively to the coupling bar 33. This tendency to uplift the rear end of the coupling bar by means of the tail part 56 of the turning piece 39 also conduces to forcibly float or urge the teeth 38 into full mesh with the snatch roll teeth.

Having turned the piece 39 fully clockwise to the stop position relatively to the coupling bar, the rotating snatch roll 19 now moves the coupling bar like a rack rearwardly in a path tangent to the snatch roll 19 and concomitantly rocks the intermediate lever 49 counter-clockwise from the Figure 2 position to effect upward case shift of the platen frame 10 through the link 51 and shift frame 13.

After the inception of the rearward movement of the coupling bar 33 by the rotating snatch roll 19, a laterally projecting fin 60 on the coupling bar 33 begins to ride over the top of a preferably fixed plate 61 whereby said fin and plate cooperate to keep positively the rear end of the coupling bar 33 uplifted to prevent disengagement of the coupling bar teeth 38, 43 from the snatch roll during such time as the snatch roll is to drive the coupling bar rearwardly for effecting the case shift. It may be noted that the fin 60 becomes raised into position to pass over said plate 61, concomitantly with the lift of the rear end of the coupling bar into engagement with the snatch roll. Slightly before the end of the snatch roll drive of the coupling bar 33, a rear cam end 63 of the latter engages an abutment 64 which may be the rounded head of a screw 65 threaded into a stud 66 on the machine frame.

At a suitable time before the rearwardly moving coupling bar cam end 63 contacts said abutment 64, the front edge of the coupling bar fin 60 will have passed clear of the rear edge of the plate 61 preparatory to disengagement of the coupling bar 33 from the snatch roll. It will be apparent that said disengagement is effected as the cam end 63 of the rearwardly moving coupling bar reacts against the abutment 64 to deflect the rear end portion of the coupling bar, and its fin 60, downwardly about the fulcrum 34, 35.

The abutment screw 65 is turnable to raise or lower the abutment 64 for adjustably timing the instant of contact of the coupling-bar cam end 63 with said abutment and hence timing the instant of disengagement of the coupling bar from the snatch roll, the timing being effected relatively to completion of the upward case shift movement of the platen frame 10. A check nut 69 holds the screw 65 in adjusted position. The instant of disengagement of the coupling bar teeth 43 from the snatch roll teeth may precede completion of said upward case shift movement of the frame 10 inasmuch as said completion may be effected by the momentum of the parts.

A latch device, not shown, may be employed to sustain the platen frame 10 in upper case position as long as the case-shift key lever 23 remains depressed.

The coupling bar 33, disengaged from the snatch roll 19, may return forwardly to normal position concomitantly with return of the shift frame 13 to lower case positions. During the forward movement of the coupling bar 33, its fin 60, now lowered and thus switched relatively to the plate 61, may ride upon the top surface of the cross bar 57 so as to pass under the plate 61 as in Figure 1, and ultimately pass beyond the plate 61 and the cross bar 57 to its extreme forward normal position, Figure 2.

Before the forwardly moving fin 60 leaves the cross-bar 57, the latter will have become engaged with the tail part 56 of the piece 39 to turn the latter back counter-clockwise to normal position through the forward movement of the coupling bar 33. The tail part 56 of the restored piece 39, instead of the fin 60, thus finally bears on the cross-bar 57 to maintain the rear arm of the coupling bar in its normal level of disengagement from the snatch roll.

The plate 61 and an underlying spacer block 70 may be secured to the cross bar 57 as by rivets 71. The spacer block 70 provides a space 72, between the plate 61 and the cross bar 57, for passage of the coupling bar fin under said plate in the forward return movement of the coupling bar 33. The coupling bar fin 60 may be formed integrally with the toothed block 45. The front and rear edges of the fin 60 and of the plate 61 may be beveled as at 73 to reduce liability of blocking the starts of the passages of the fin 60 over and under the plate 61.

Near its forward end the coupling bar 33 may be guided laterally in a slot of a guide plate 74 attached to the framework. In the rearward stroke of the coupling bar 33, its forward end 76 may pass beyond the tab 31 of the shift-key lever dog 28 so as to permit the above described cammed disengagement of the coupling bar from the snatch roll while the shift lever 23 remains depressed to sustain the case shift through the above-mentioned latch device, not shown. Should the shift key lever 23 happen to be depressed during forward restoring movement of the coupling bar 33, such movement will not be impeded by the dog 28 inasmuch as the latter may yield by turning clockwise about its pivot 27 upon encounter of the now raised forward end 76 of the coupling bar with the rear face of the dog tab 31, and upon return of the key lever to normal position, said dog will reassume its normal position with the tab 31 above the coupling bar land 32 as in Figure 2. A stop 75 on the framework may suitably limit the down stroke of the shift key lever 23.

It will be seen now that the described coupling bar mechanism enables the snatch roll 19 to effect the desired power driven movement of heavy or resistant mechanism, such as the described case-shift mechanism, during a prolonged period of revolution of the snatch roll 19. For example, assuming that the snatch roll has ten teeth and engages successively the herein shown ten teeth, 38, 43 of the coupling bar 33 in driving relationship before the coupling bar becomes disconnected, it will be during substantially a whole revolution of the snatch roll 19 that the latter drives the coupling bar 33 to effect the case shift. It will be evident, in comparison, that if the number of teeth of the coupling bar were limited to two teeth like in the type action drive link 20, it would be, say, during a quarter of a revolution of the snatch roll that the case shift would have to be effected. Thus, by means of the extensively toothed coupling bar 33, the snatch roll effects the case shift at about one-quarter of the speed at which it would be effected by a drive link limited to one or two teeth like the type action drive link 20. The case shift movement effected by means of the coupling bar 33 is therefore not impulsive nor at objectionable speed and this conduces materially to reliable operation of the case shift and to reduction of noise and wear-producing shocks on the mechanisms.

Variations may be resorted to within the scope of the invention and portions of the improvements may be used without others.

What is claimed is:

1. A power actuated typing machine having a rotary toothed snatch roll and a part to be movably actuated by means of said roll, in combination with a coupling bar movable to engage said snatch roll to be driven rackwise by the latter to actuate said part, said bar including a rack-forming series of snatch-roll-engaging teeth, at least one of the leading teeth of said bar being incorporated in an element movably mounted on said bar so that the leading tooth or teeth is or are capable of limited movement by the snatch roll relatively to the remaining portion of the series of teeth in order to bring the leading tooth or teeth into proper mesh with the snatch roll teeth when said bar is moved to engage the snatch roll, said movement being in a direction transverse to the snatch roll axis and said remaining portion of the series of teeth being substantially incapable of such movement relatively to said bar.

2. In a power actuated typing machine having a rotary toothed snatch roll and a part to be movably actuated by means of said roll; a coupling bar movable to engage said snatch roll to be driven rack-wise by the latter to actuate said part, said bar including a rack-forming series of snatch-roll engaging teeth, at least one of the leading teeth of said bar being incorporated in an element pivoted to said bar on a snatch-roll-paralleling axis so that the leading tooth or teeth is or are capable of movement by said snatch roll about said axis relatively to the remaining portion of said series of teeth, means being provided to limit movement of said element about said axis so as to enable the snatch roll finally to initiate movement of said bar by means of said leading tooth or teeth.

3. In a power actuated typing machine having a main frame, a rotary toothed snatch roll, and a part to be movably actuated by means of said roll; a lever swingable about a fulcrum in said frame to actuate said part, a toothed coupling rack having a cam-edge-and-follower connection to said lever, a fulcrum, apart from said connection, about which said rack is rockable to engage said snatch roll, said fulcrum being arranged to permit said rack to be driven rackwise by said snatch roll to swing said lever, the cam edge being biased so that its reaction with said follower tends to cam said rack toward said roll and thereby tends to keep said rack in engagement with said roll at least during the initial portion of the swing of said lever by the snatch-roll-driven rack.

4. In a power actuated typing machine having a rotary toothed snatch roll and a part to be movably actuated by means of said roll; a coupling bar movable to engage said snatch roll to be driven rackwise by the latter to actuate said part, said bar including a rack-forming series of snatch-roll-engaging teeth, at least one of the leading teeth of said bar being incorporated in an element pivoted to said bar on a snatch-roll-paralleling axis so that the leading tooth or teeth is or are capable of movement by said snatch roll about said axis relatively to the remaining portion of said series of teeth, said element being adapted to stop against said bar to limit its snatch-roll-driven movement about said axis and the tooth or teeth of said moved element being then in rack-tooth-spacing relation to said remaining portion of the teeth.

5. In a power actuated typing machine having a frame, a rotary snatch roll, and a part to be actuated by said roll; a lever swingable about a fulcrum in said frame to actuate said part, a coupler having a cam-edge-and-follower connection to said lever, and means supporting said coupler for movement into and out of engagement with said snatch roll, said connection being adapted to permit said movement, and said supporting means being adapted to permit said coupler to be driven by said snatch roll to swing said lever, the cam edge being biased so that its reaction with said follower tends to cam said coupler toward said roll during at least the initial portion of the swing of said lever by the snatch roll driven coupler.

6. In a power actuated typing machine having a frame, a rotary snatch roll, and a part to be actuated by said roll; a lever swingable about a fulcrum in said frame to actuate said part, a coupler having a cam-edge-and-follower connection to said lever, means supporting said coupler for movement into and out of engagement with said snatch roll, said connection being adapted to permit said movement, and said supporting means being adapted to permit said coupler to be driven by said snatch roll to swing said lever, the cam edge being biased so that its reaction with said follower tends to cam said coupler toward said roll during at least the initial portion of the swing of said lever by the snatch roll driven coupler, and a restraining guide cooperating with said coupler to oppose disengagement of said coupler from the snatch roll so that said disengagement cannot be effected until a predetermined extent of swing of said lever has been effected, said camming reaction decreasing materially as said lever approaches said predetermined extent of swing.

7. In a power actuated typing machine having a frame, a rotary snatch roll, and a part to be actuated by said roll; a lever swingable about a fulcrum in said frame to actuate said part, a coupler having a cam-edge-and-follower connection to said lever, and means supporting said coupler for movement into and out of engagement with said snatch roll, said connection being adapted to permit said movement, and said supporting means being adapted to permit said coupler to be driven by said snatch roll to swing said lever, the cam edge being biased so that its reaction with said follower tends to cam said coupler transversely of said snatch roll during the snatch roll driven movement of said coupler.

8. In a machine having a movably actuatable part and a rotary snatch roll; a coupler engageable with and drivable by said snatch roll for actuating said part, said coupler including snatch-roll-engaging edge-means extending transversely of and therefore in tangentially drivable relation to said snatch roll, the leading portion of said edge-means being incorporated in an element pivoted to said coupler on a snatch-roll-paralleling axis so that said leading portion is capable of movement by said snatch roll about said axis relatively to the remaining portion of said edge-means, said element being adapted to stop against said coupler to limit its snatch-roll-driven movement about said axis, and said remaining portion being then substantially in extension relation to said leading portion of said edge-means, said remaining portion of said edge-means being immovable relatively to said coupler.

HENRY L. PITMAN.